(12) United States Patent
Shiraishi et al.

(10) Patent No.: US 8,774,583 B2
(45) Date of Patent: Jul. 8, 2014

(54) OPTICAL DEVICE AND OPTICAL TRANSMITTER

(75) Inventors: Takashi Shiraishi, Kawasaki (JP); Tetsu Hasegawa, Kawasaki (JP); Masaharu Doi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 373 days.

(21) Appl. No.: 12/685,374

(22) Filed: Jan. 11, 2010

(65) Prior Publication Data

US 2010/0178064 A1 Jul. 15, 2010

(30) Foreign Application Priority Data

Jan. 13, 2009 (JP) .................................... 2009-4804

(51) Int. Cl.
*G02B 6/10* (2006.01)

(52) U.S. Cl.
USPC .......................................... 385/132; 385/129

(58) Field of Classification Search
None
See application file for complete search history.

(56) References Cited

U.S. PATENT DOCUMENTS

| | | | | |
|---|---|---|---|---|
| 4,810,049 | A * | 3/1989 | Fischer et al. | 385/132 |
| 7,603,002 | B2 * | 10/2009 | Sugiyama | 385/3 |
| 2002/0159706 | A1 | 10/2002 | Mitomi et al. | |
| 2004/0184755 | A1 | 9/2004 | Sugiyama et al. | |
| 2005/0175271 | A1 | 8/2005 | Sugiyama et al. | |
| 2006/0133726 | A1 | 6/2006 | Sugiyama et al. | |

FOREIGN PATENT DOCUMENTS

| | | |
|---|---|---|
| JP | 5-60929 | 3/1993 |
| JP | 06-018735 | 1/1994 |
| JP | 06018735 A * | 1/1994 |
| JP | 11-167032 | 6/1999 |
| JP | 2004-287093 | 10/2004 |
| JP | 2005-221874 | 8/2005 |
| JP | 2007-94440 | 4/2007 |
| WO | 02/23264 | 3/2002 |
| WO | WO2007/025037 | 3/2007 |

OTHER PUBLICATIONS

Japanese Office Action mailed May 29, 2012 in corresponding Japanese Application No. 2009-004804.
Japanese Office Action mailed Sep. 11, 2012 in corresponding Japanese Application No. 2009-004804.

* cited by examiner

*Primary Examiner* — Sarah Hahm
(74) *Attorney, Agent, or Firm* — Staas & Halsey LLP

(57) ABSTRACT

An optical device and an optical transmitter are provided. The optical device includes a substrate, a first optical waveguide that may be formed in the substrate and may have a bending portion, and a second optical waveguide that intersects with the bending portion of the first optical waveguide, wherein a groove may be formed outside the bending portion of the first optical waveguide in the substrate.

8 Claims, 17 Drawing Sheets

1500

OPTICAL DEVICE AND OPTICAL TRANSMITTER

CROSS REFERENCE TO RELATED APPLICATIONS

This application is related to and claims priority to Japanese Patent Application No. 2009-004804, filed on Jan. 13, 2009, and incorporated herein by reference.

BACKGROUND

1. Field

The embodiments discussed herein are directed to an optical device and an optical transmitter.

2. Description of the Related Art

Recently speed enhancement advances have been made in optical communication technology, e.g., a transition from 10 Gb/s to 40 Gb/s. Development of an optical transmitter and an optical receiver, which are used in a communication system of 40 Gb/s or 100 Gb/s is anticipated.

Because a compact optical device in which an optical waveguide is used exhibits excellent characteristics, the optical device is commercially used in various devices such as an optical modulator, an optical receiver, and an optical switch. With progress of the communication system, a increased performance is demanded for the optical waveguide, and there is a need for improved optical waveguides.

For example, Japanese Patent Application Laid-Open No. 5-60929 and International Publication No. WO2002/023264 discloses an intersection optical waveguide. Japanese Patent Application Laid-Open No. 2007-94440 discloses an optical modulator in which a folding optical waveguide is used.

A degree of freedom of device design may be enhanced when a bending optical waveguide such as the folding optical waveguide intersects with another optical waveguide.

FIG. 1 illustrates a typical bending optical waveguide 110 with input 100 and output 120. FIG. 2 is a sectional view taken on a line 108-109' of FIG. 1. The optical waveguide 110 of FIGS. 1 and 2 is a diffusion optical waveguide that is provided by diffusing Ti or the like in a substrate 130 made of LiNbO$_3$ used in the optical modulator. In the substrate 130, a groove 140 may be formed outside a bending portion of the optical waveguide 110. An optical mode field 200 of the bending portion may be biased toward the outside of the bending portion as illustrated in FIG. 2. Accordingly, a medium such as the groove 140 (air layer having a refractive index n=1) having a refractive index difference larger than that of the optical waveguide 110 (LiNbO$_3$ diffusion optical waveguide having a refractive index n=2.15) may be disposed outside the bending portion, which allows a low-loss bending optical waveguide to be implemented. The air layer may be an inert gas such as nitrogen or vacuum.

When another optical waveguide intersects with the bending portion of the optical waveguide 110, another optical waveguide intersects with the bending portion while the bending portion is returned to a linear optical waveguide, whereby an intersection portion may be formed by the methods disclosed in Japanese Patent Application Laid-Open No. 5-60929 and International Publication No. WO2002/023264. However, the device is lengthened, and a connection loss (up to 1 dB at two points) is generated in a connecting portion of the bending portion of the optical waveguide 110 and the linear optical waveguide.

SUMMARY

It is an aspect of the embodiments discussed herein to provide an optical device and an optical transmitter.

The above aspects can be attained by an optical device including a substrate; a first optical waveguide that may be formed in the substrate and may have a bending portion; and a second optical waveguide that intersects with the bending portion of the first optical waveguide, wherein a groove may be formed outside the bending portion of the first optical waveguide in the substrate.

These together with other aspects and advantages which will be subsequently apparent, reside in the details of construction and operation as more fully hereinafter described and claimed, reference being had to the accompanying drawings forming a part hereof, wherein like numerals refer to like parts throughout.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DETAILED DESCRIPTION OF THE INVENTION

Figure 1:
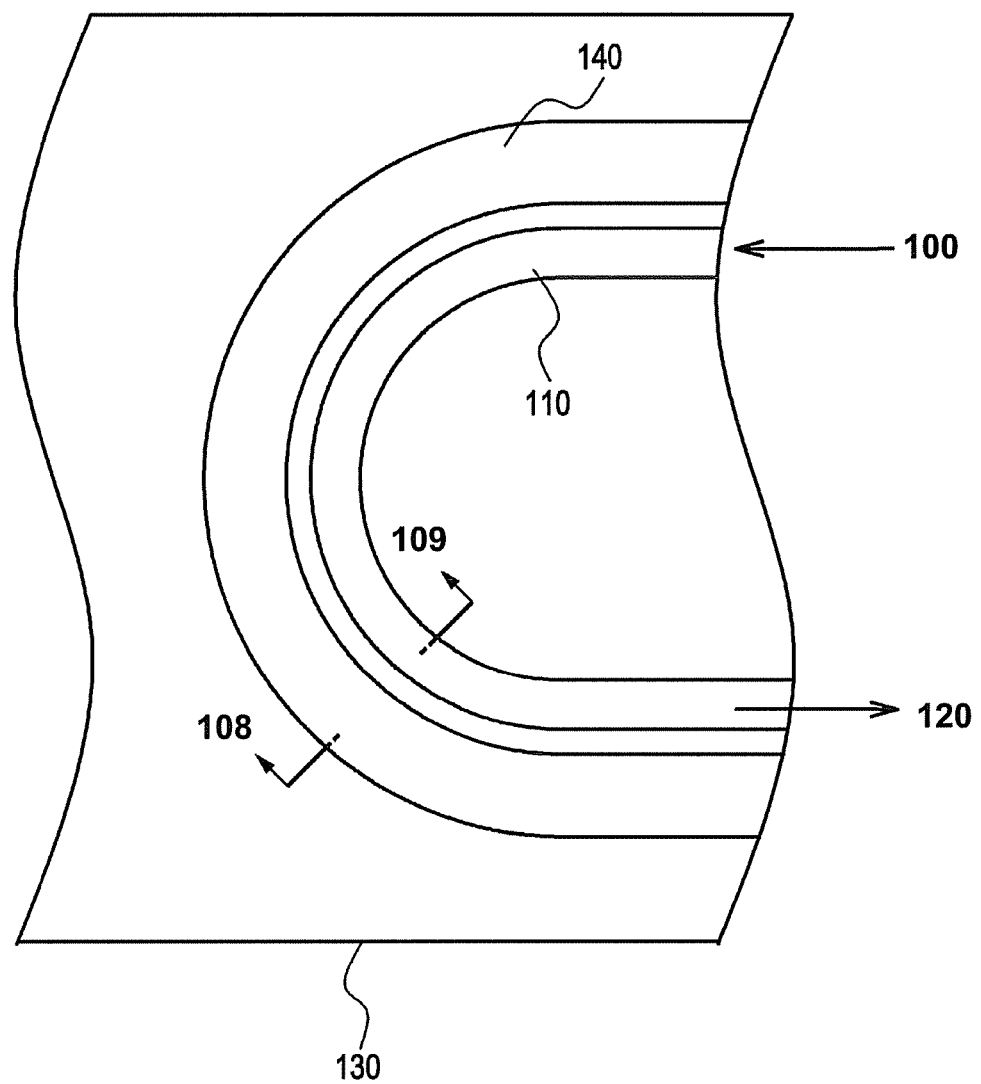
FIG. 1 illustrates an exemplary bending optical waveguide.
Figure 2:
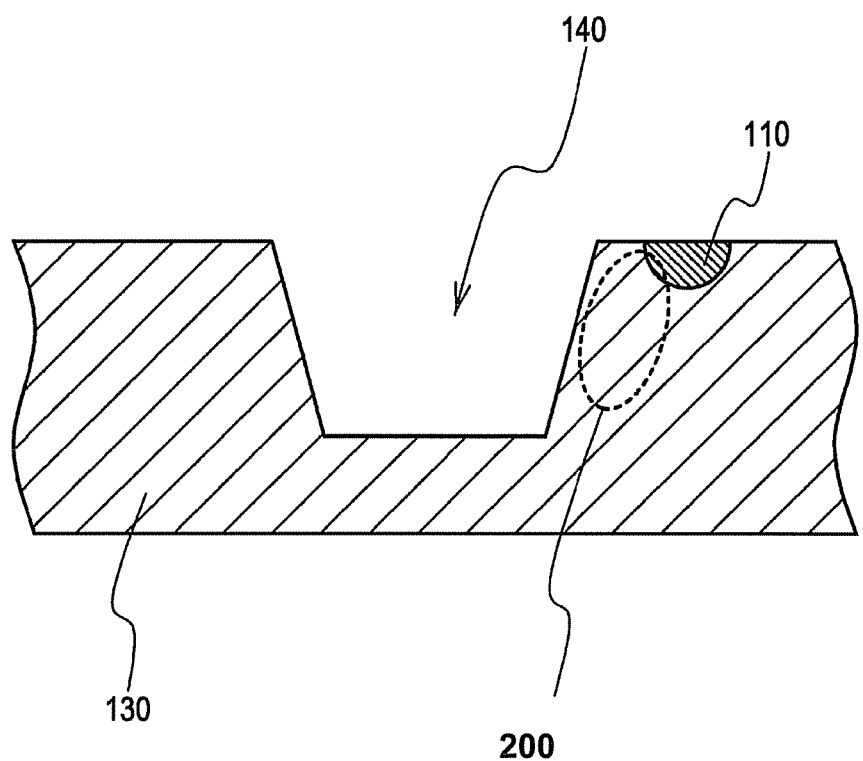
FIG. 2 is a sectional view taken on a line 108-109 of FIG. 1.
Figure 3:
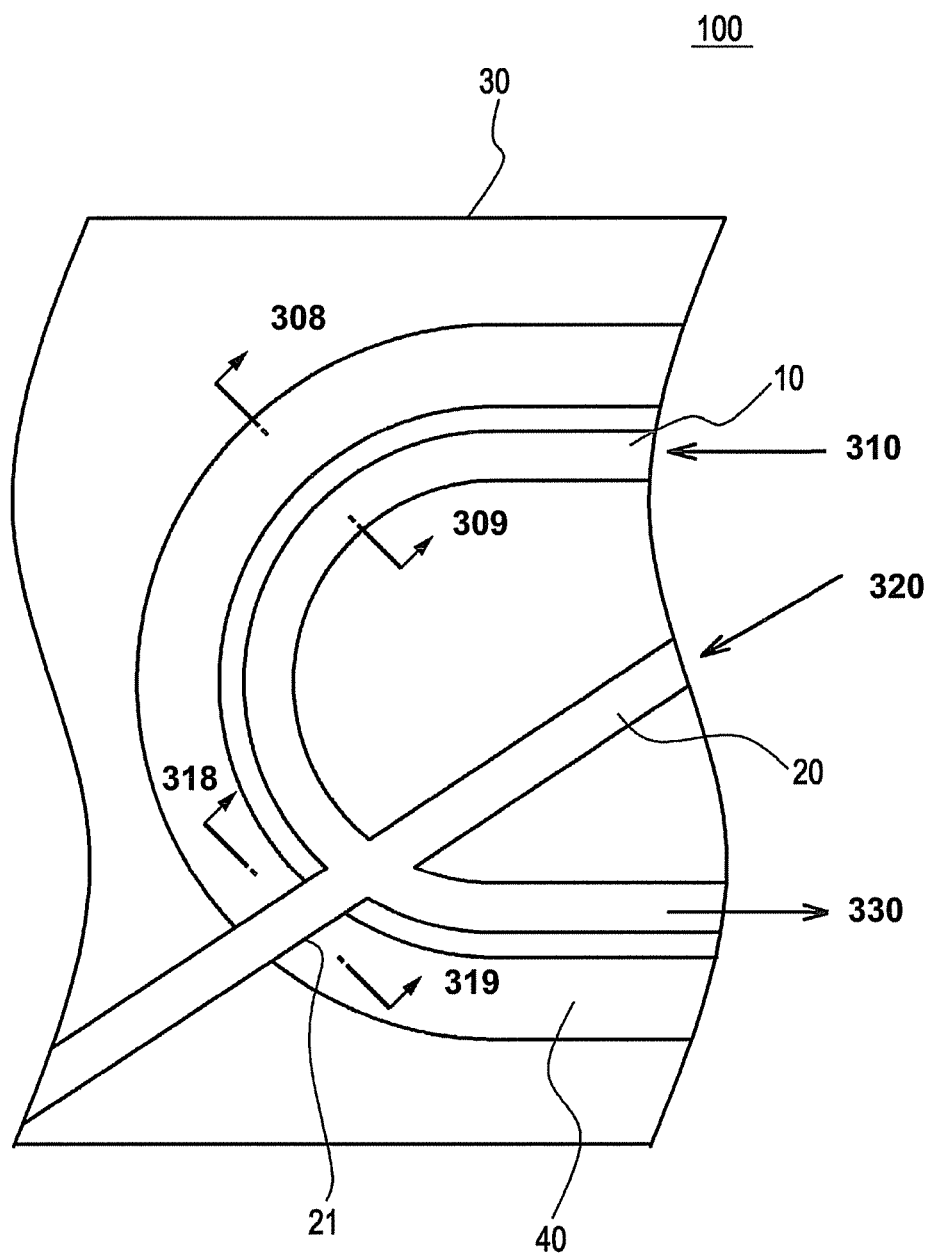
FIG. 3 is a plan view illustrating an optical device according to a first exemplary embodiment.
Figure 4A:
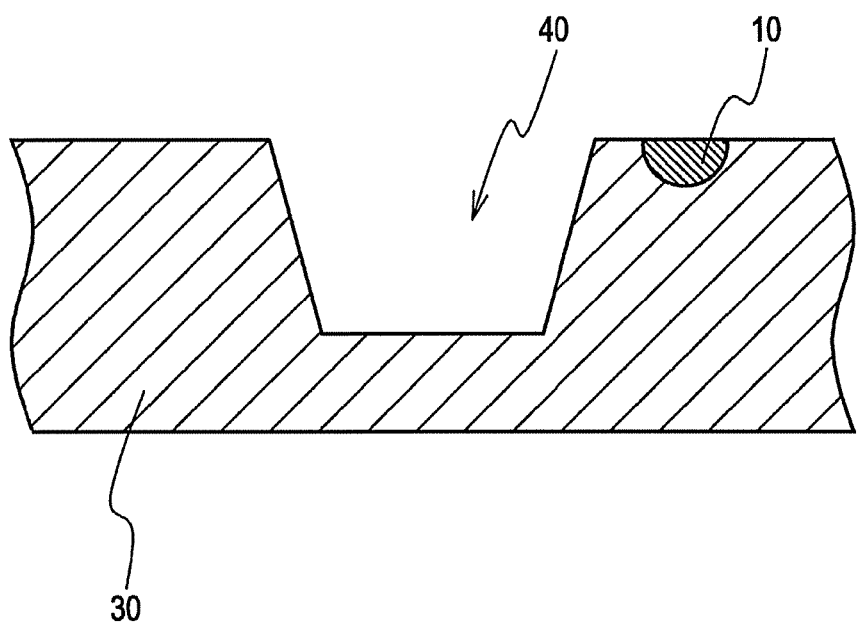
FIG. 4A is a sectional view taken on a line 308-309 of FIG. 3.
Figure 4B:
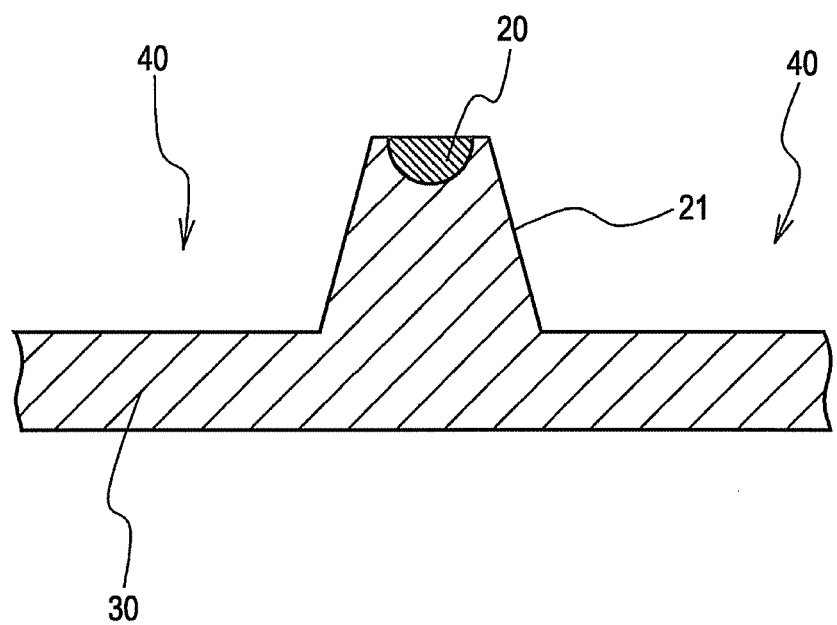
FIG. 4B is a sectional view taken on a line 318-319 of FIG. 3.

FIG. 3 illustrates an optical device 100 according to a first embodiment . FIG. 4A is a sectional view taken on a line 308-309 of FIG. 3, and FIG. 4B is a sectional view taken on a line 318-319 of FIG. 3. The optical device 100 will be described below with reference to FIGS. 3, 4A, and 4B.

The optical device 100 may have included a first optical waveguide 10 and a second optical waveguide 20 are formed in a substrate 30. For example, the substrate 30 is a LiNbO$_3$ substrate. The first optical waveguide 10 and the second optical waveguide 20 are a diffusion optical waveguide that may be formed by diffusing Ti or the like in the substrate 30. FIG. 3 illustrates inputs 310, 320 and output 330.

The first optical waveguide 10 may be a bending optical waveguide having a bending portion. The light propagating through the first optical waveguide 10 propagates unevenly through an outside of the bending portion. Therefore, in order to reduce a light propagation loss of the first optical waveguide 10, a groove portion 40 may be formed outside the bending portion of the first optical waveguide 10 in the substrate 30. The groove portion 40 may have a shape curved along the bending portion of the first optical waveguide 10.

The second optical waveguide 20 may be a linear optical waveguide. The second optical waveguide 20 may be formed so as to pass though a groove portion 40 to intersect with the bending portion of the first optical waveguide 10. The second optical waveguide 20 includes a ridge portion 21 in the groove portion 40. The ridge portion 21 may have a ridge structure in which both side surfaces are removed. In an exemplary embodiment, the ridge portion 21 may have a ridge width of 9 μm or less.

The ridge portion 21 may be formed by an RIE (Reactive Ion Etching) technique using a mask. The narrow ridge width may be realized by an apparatus that can produce the mask with submicron resolution and the mask having an etching-resistant property that withstands etching of a depth of about 10 μm with the RIE technique.

In the first embodiment, it is not necessary to linearly form the first optical waveguide 10 in an intersection portion of the first optical waveguide 10 and the second optical waveguide 20. Therefore, enlargement of the optical device may be prevented. Because the second optical waveguide 20 has the ridge structure in the groove portion 40, a width of an interruption portion of the groove portion 40 becomes smaller. Therefore, the light propagation loss may be suppressed to a low level in the bending portion of the first optical waveguide 10 to reduce the connection loss between the first optical waveguide 10 and the second optical waveguide 20.

In the first embodiment, there may be a gap between the bending portion of the first optical waveguide 10 and the groove portion 40. Alternatively, for example, the gap need not be provided between the bending portion of the first optical waveguide 10 and the groove portion 40. This is because the propagating light is biased toward the groove portion side and trapped not by a refractive index difference between the substrate (refractive index of 2.14) and the optical waveguide (refractive index of 2.16), but by a refractive index difference between the optical waveguide (refractive index of 2.16) and the groove portion (refractive index of 1.0). Accordingly, the propagation loss does not largely vary whether the diffusion optical waveguide is partially left or not left between the first optical waveguide 10 and the groove portion 40.

Figure 5:
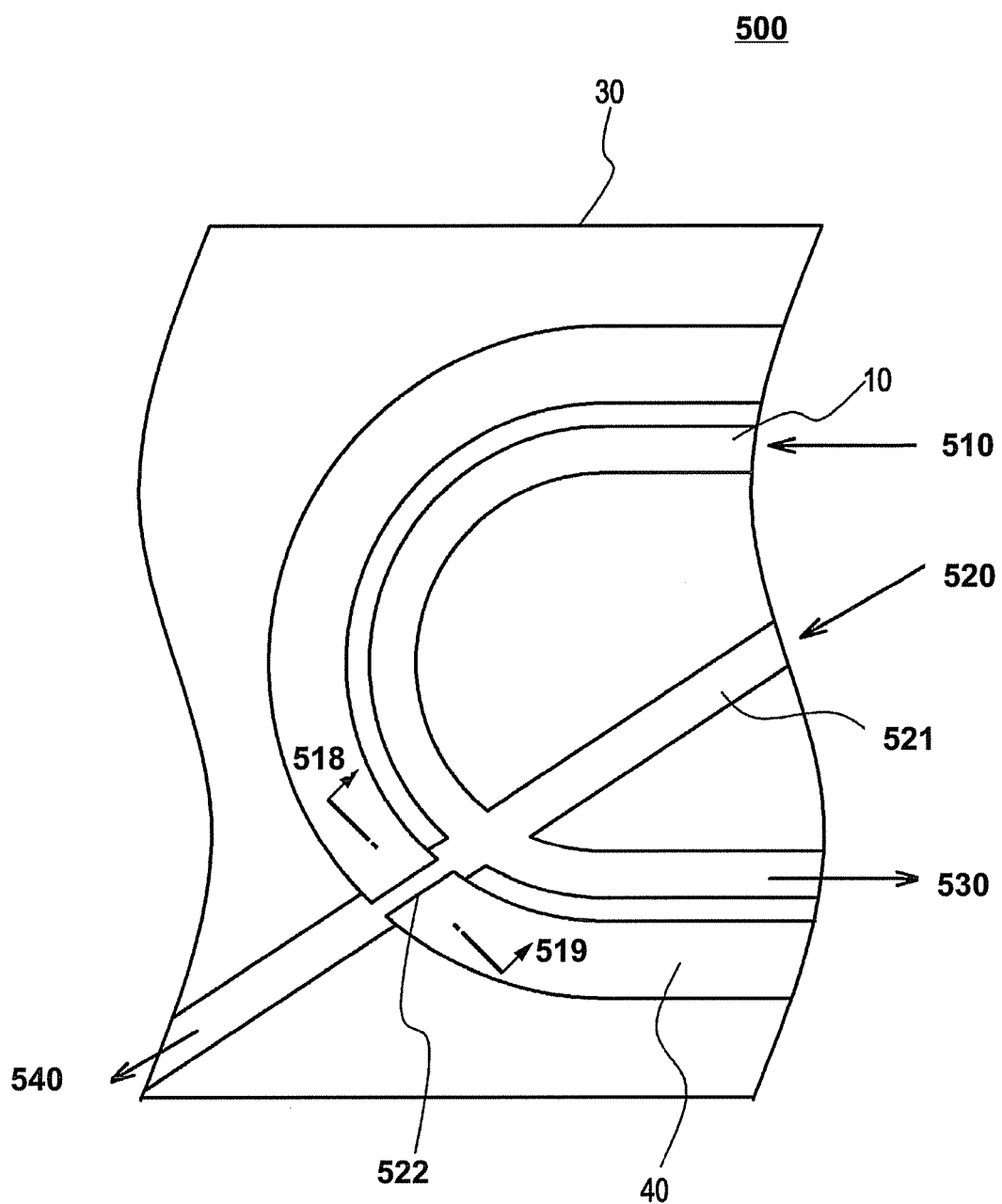
FIG. 5 is a plan view illustrating an optical device according to an exemplary embodiment.
Figure 6A:
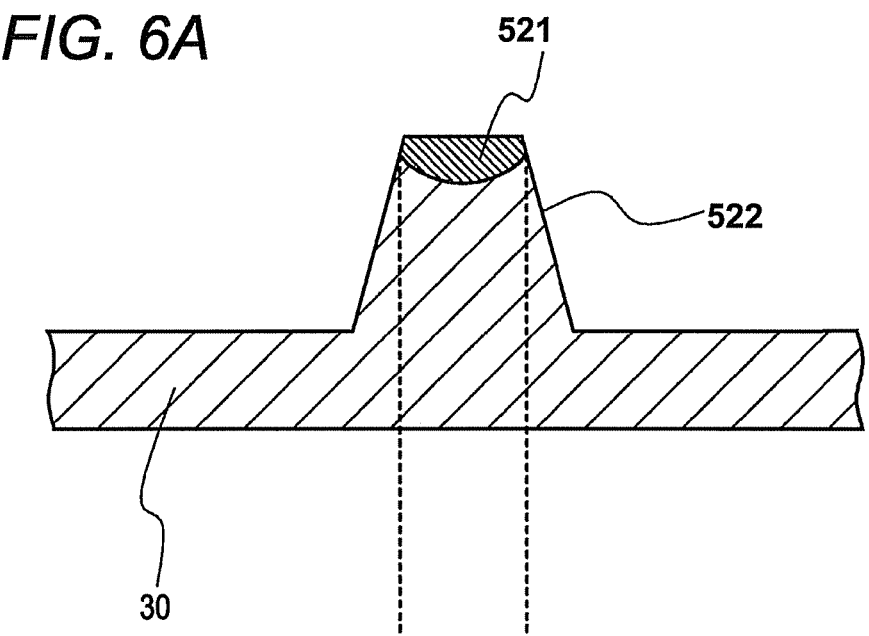
FIGS. 6A and 6B illustrate a sectional view taken on a line 518-519 of FIG. 5.
Figure 6B:
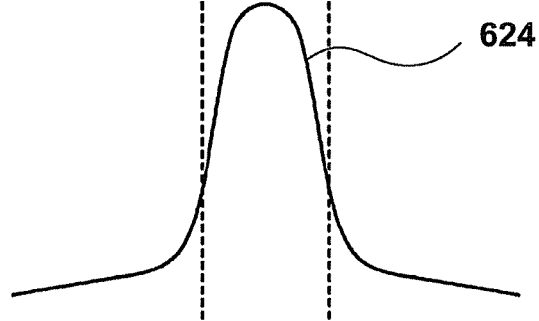

FIG. 5 illustrates an optical device 500 according to a first modification of a first embodiment. FIG. 6 is a sectional view taken on a line 518-519 of FIG. 5. The optical device 500 differs from the optical device 100 of FIG. 3 in that a second optical waveguide 521 is provided instead of the second optical waveguide 20. The second optical waveguide 521 includes a ridge portion 522 in the groove portion 40. The ridge portion 522 has the ridge structure in which both side surfaces are removed.

The ridge portion 522 may have a ridge width that is smaller than a width of the second optical waveguide 521 in the points except for the groove portion 40. At this point, the width of the interruption portion of the groove portion 40 is further narrowed, so that the light propagation loss may be suppressed to a low level in the bending portion of the first optical waveguide 10.

When the width of the optical waveguide may be narrowed as the ridge width may be narrowed, the optical mode field 624 is partially reduced to generate a risk of an excessive loss. This is because the light propagating through the ridge portion is scattered due to roughness of a ridge sidewall portion. However, as illustrated in FIG. 6, because the light intensity is weak at both side ends of the optical waveguide, the excessive loss may be suppressed. The side ends of the second optical waveguide 521 may be symmetrically trimmed in relation to a peak of the light intensity, which allows the excessive loss of the optical mode field to be suppressed.

Figure 7:
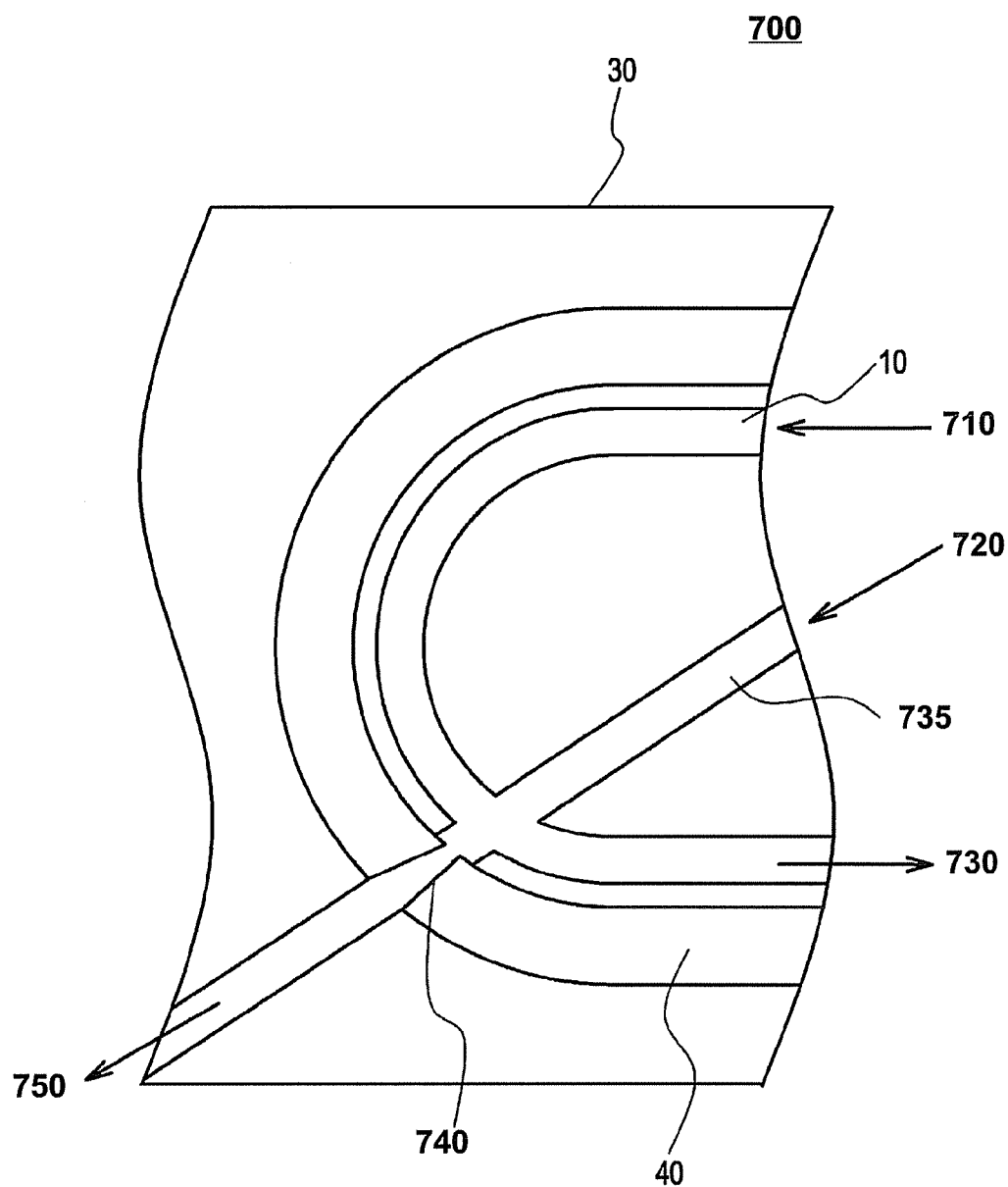
FIG. 7 is a plan view illustrating an optical device according to an exemplary embodiment.

FIG. 7 illustrates an exemplary optical device 700. The optical device 700 differs from the optical device 100 of FIG. 3 in that a second optical waveguide 735 is provided instead of the second optical waveguide 20. The second optical waveguide 735 includes a ridge portion 740 in the groove portion 40. The ridge portion 740 has the ridge structure in which both side surfaces are removed. FIG. 7 illustrates inputs 710 and 720 and outputs 730 and 750.

The ridge width of the ridge portion 740 may be gradually narrowed toward the first optical waveguide 10 from the side opposite the first optical waveguide 10 of the groove portion 40. For the narrow ridge width, the excessive loss is generated by mismatch between an optical mode field of the ridge portion and an optical mode field of a portion except for the ridge portion. In such cases, the excessive loss may be suppressed by gradually changing the optical mode field. In the bending portion of the first optical waveguide 10, the width of the interruption portion of the groove portion 40 may be narrowed. Therefore, the light propagation loss may be suppressed to a lower level in the bending portion of the first optical waveguide 10. The ridge portion 740 may have a wide width on the side opposite the first optical waveguide 10 of the groove portion 40, so that the excessive loss may be suppressed in the second optical waveguide 735.

Figure 8:
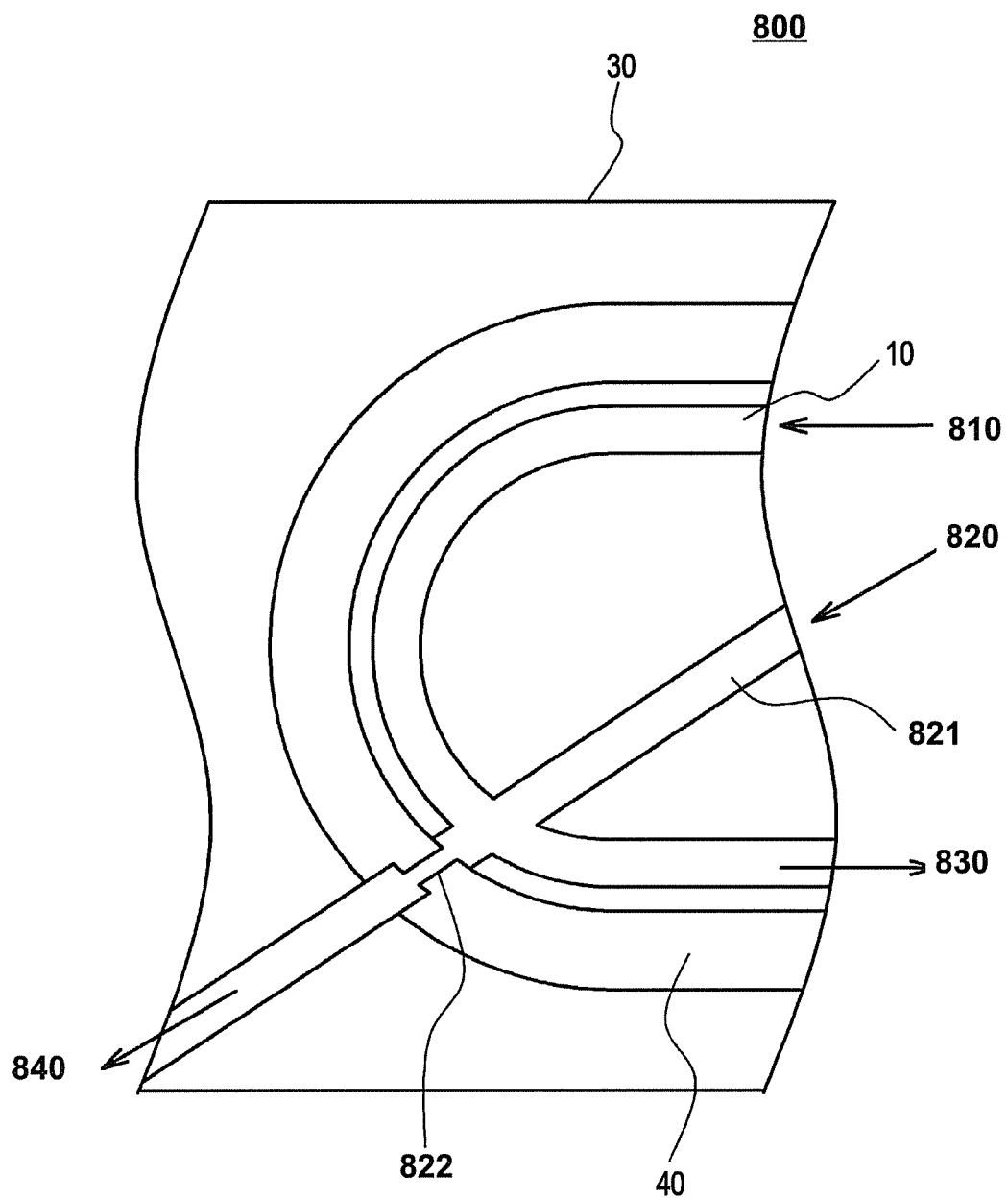
FIG. 8 is a plan view illustrating an optical device according to an exemplary embodiment.

FIG. 8 illustrates an exemplary optical device 800. The optical device 800 differs from the optical device 100 of FIG. 3 in that a second optical waveguide 821 is provided instead of the second optical waveguide 20. The second optical waveguide 821 includes a ridge portion 822 in the groove portion 40. The ridge portion 822 has the ridge structure in which both side surfaces are removed. FIG. 8 illustrates inputs 810 and 820 and outputs 830 and 840.

The ridge width of the ridge portion 822 may be narrowed on the side of the first optical waveguide 10 of the groove portion 40. At this point, the width of the interruption point of the groove portion 40 can be narrowed in the bending portion of the first optical waveguide 10. Therefore, the light propagation loss may be suppressed to a lower level in the bending portion of the first optical waveguide 10. The ridge portion 822 may have a wide width on the side opposite the first optical waveguide 10 of the groove portion 40, so that the excessive loss may be suppressed in the second optical waveguide 821.

Figure 9:
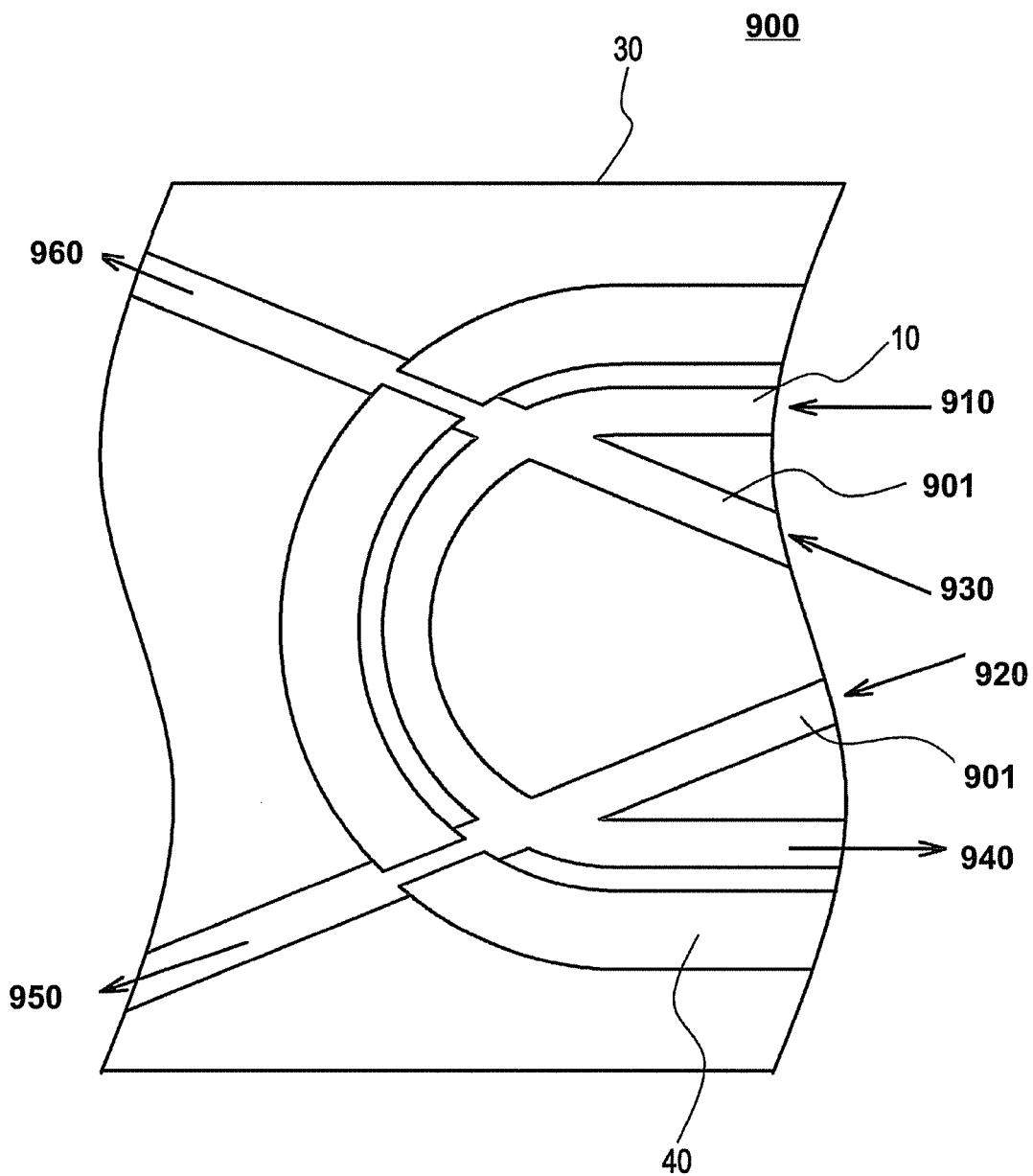
FIG. 9 is a plan view illustrating an optical device according an exemplary embodiment.

FIG. 9 illustrates an exemplary optical device 900. The optical device 900 differs from the optical device 100 of FIG. 3 in that plural second optical waveguides 901 are provided instead of the second optical waveguide 20. The second optical waveguide 901 may be one of the second optical waveguides 20 to 821. The second optical waveguides 901 intersect with the first optical waveguide 10 at different points in the bending portion of the first optical waveguide 10. There is no limitation to the number of optical waveguides intersecting with the bending portion of the first optical waveguide 10. FIG. 9 illustrates inputs 910, 920, and 930 and outputs, 940, 950, and 960.

Figure 10:
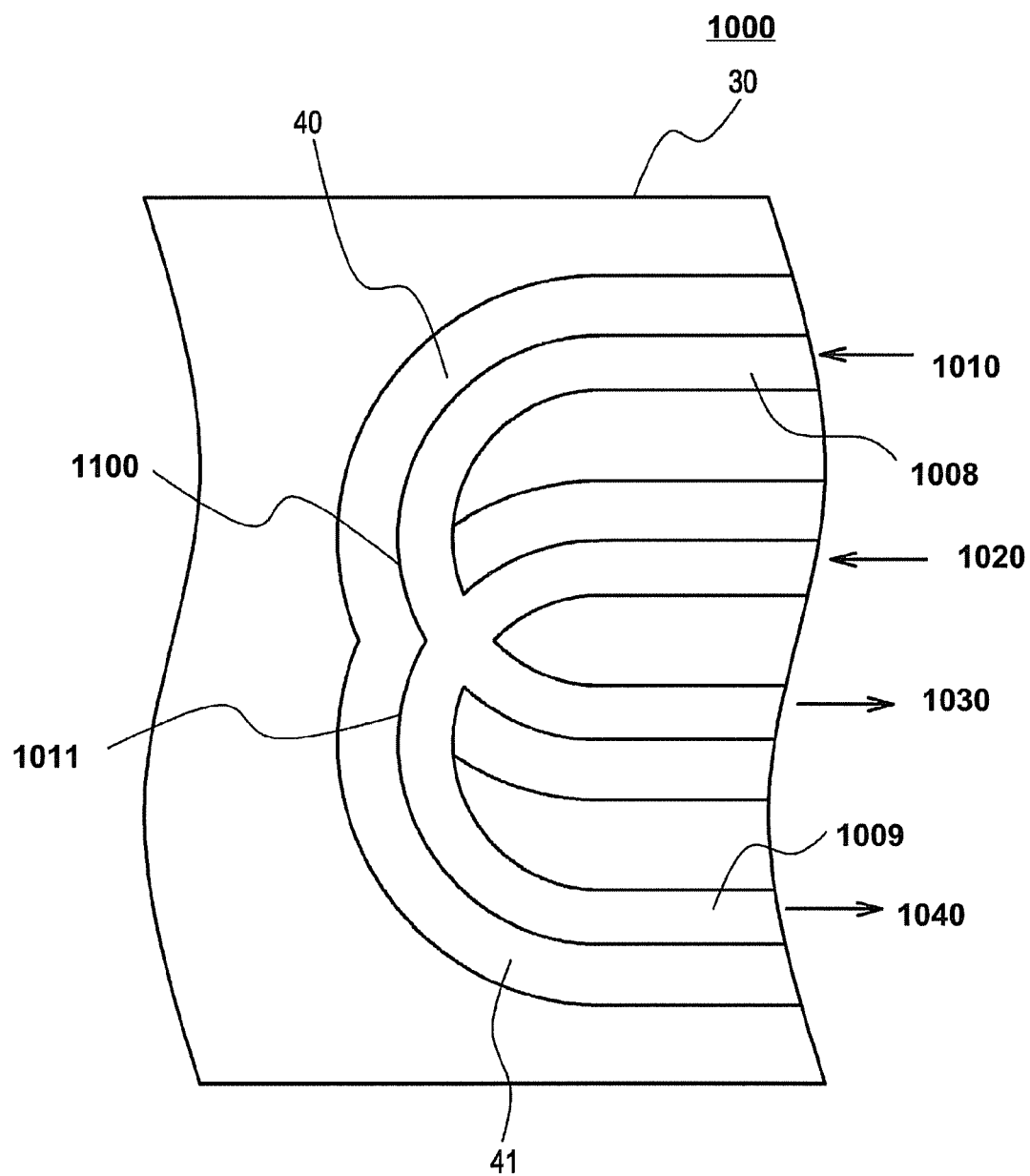
FIG. 10 is a plan view illustrating an optical device according to a second embodiment.

FIG. 10 illustrates an exemplary optical device 1000. The optical device 1000 differs from the optical device 100 of FIG. 3 in that a first optical waveguide 1008 is provided instead of the first optical waveguide 10 while a second optical waveguide 1009 is provided instead of the second optical waveguide 20. The first optical waveguide 1008 and the second optical waveguide 1009 are a bending optical waveguide having a bending portion. In the second embodiment, the first optical waveguide 1008 and the second optical waveguide 1009 intersect with each other in the bending portions thereof.

The groove portion 40 may be formed along the outside of the first optical waveguide 1008. A groove portion 41 may be formed along the outside of the second optical waveguide 1009. Accordingly, in the substrate 30, the groove is provided inside the first optical waveguide 1008 and outside the second optical waveguide 1009, and the groove is provided inside the second optical waveguide 1009 and outside the first optical waveguide 1008. The first optical waveguide 1008 may have a ridge portion 11e having the ridge structure in the groove portion 41. The second optical waveguide 1009 may have a ridge portion 1011 having the ridge structure in the groove portion 40.

The width of the interruption portion of the groove portion formed along the outside of the first optical waveguide 1008 may be narrowed while the width of the interruption portion of the groove portion formed along the outside of the second optical waveguide 1009 may be narrowed. Therefore, the light propagation losses may be reduced in the first optical waveguide 1008 and the second optical waveguide 1009. The gap may not provided between the bending portion of the first optical waveguide 1008 and the groove portion 40, and the gap may not be provided between the bending portion of the second optical waveguide 1009 and the groove portion 40. Alternatively, for example, the gap may be provided between the bending portion of the first optical waveguide 1008 and the groove portion 40, and the gap may be provided between the bending portion of the second optical waveguide 1009 and the groove portion 40.

Figure 11:
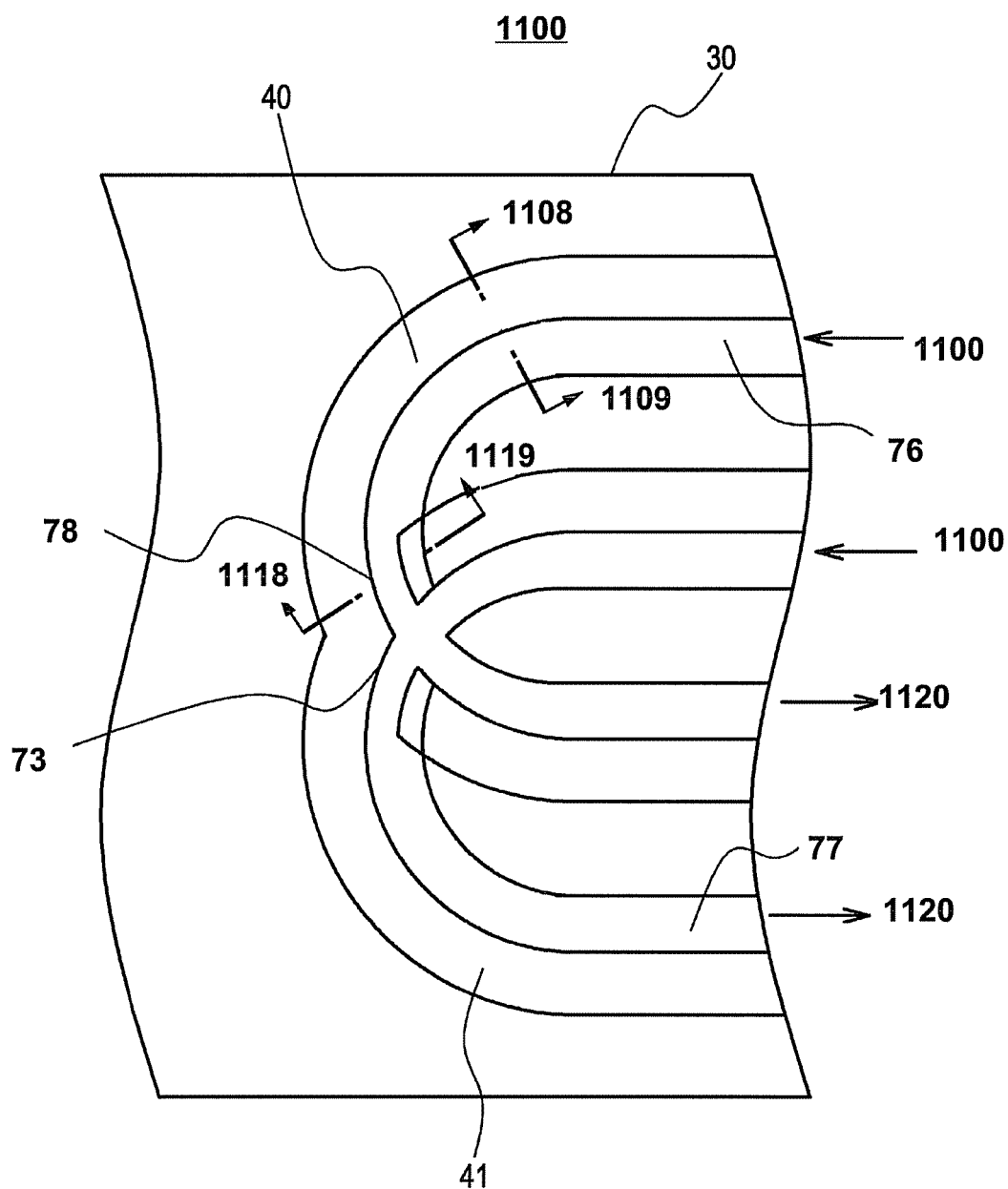
FIG. 11 is a plan view illustrating an optical device according an exemplary embodiment.
Figure 12A:
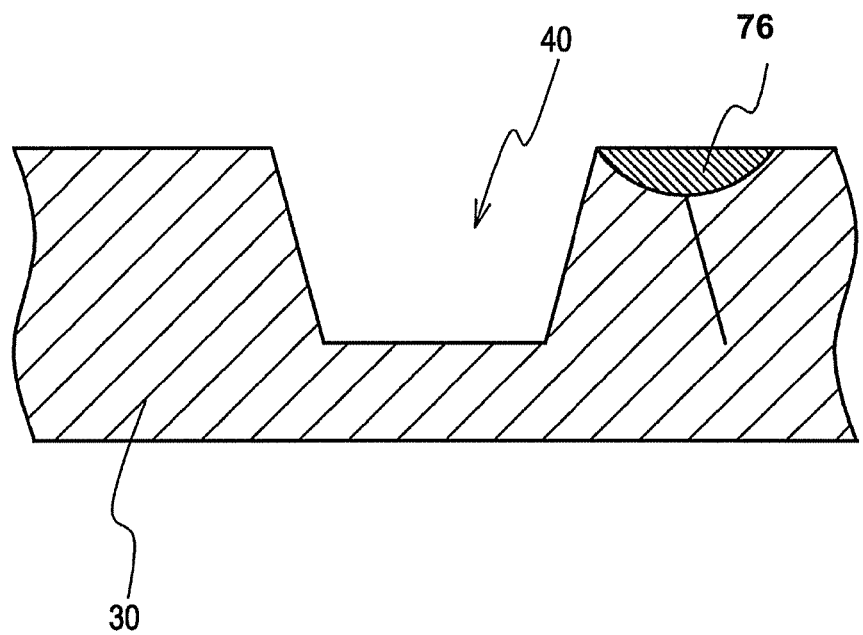
FIG. 12A is a sectional view taken on a line 1108-1109 of FIG. 11.
Figure 12B:
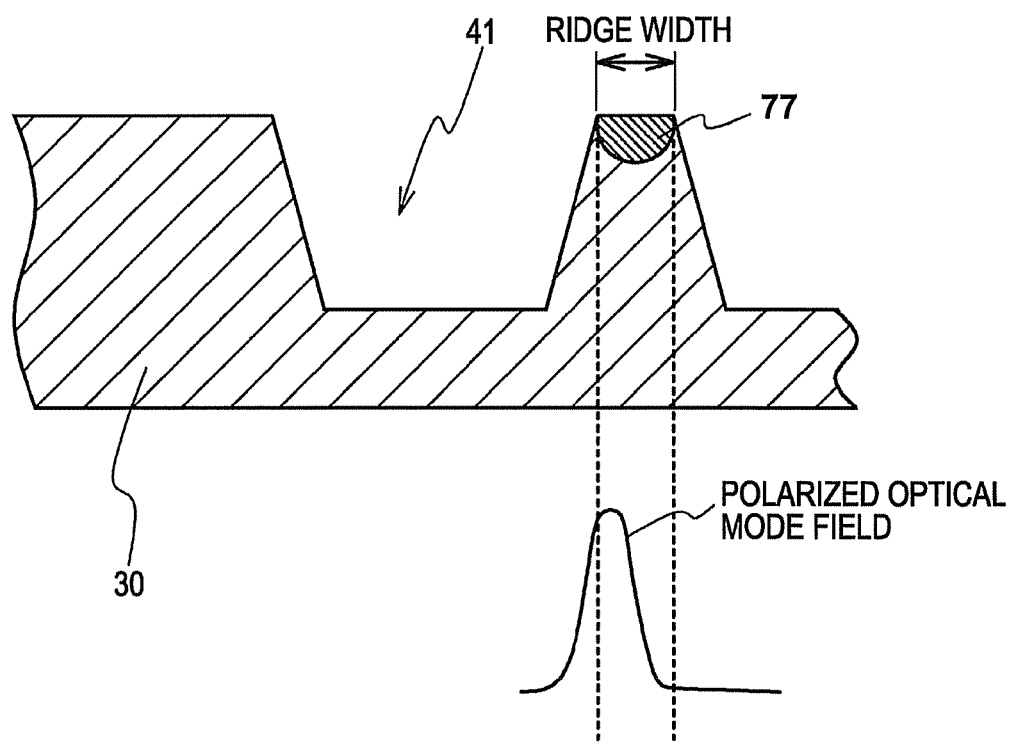
FIG. 12B is a sectional view taken on a line 1118-1119 of FIG. 11.

FIG. 11 illustrates an exemplary optical device 1100. FIG. 12A is a sectional view taken on a line 1108-1109 of FIG. 11, FIG. 12B is a sectional view taken on a line 1118-1119 of FIG. 11, and also illustrates an optical mode field of a second optical waveguide 77.

The optical device 1100 differs from the optical device 1000 of FIG. 10 in that a first optical waveguide 76 is provided instead of the first optical waveguide 1008 while a second optical waveguide 77 is provided instead of the second optical waveguide 1009. The first optical waveguide 76 includes a ridge portion 78 instead of the ridge portion 11e. The second optical waveguide 77 includes a ridge portion 73 instead of the ridge portion 1011. The ridge portion 78 may have a ridge width that is smaller than the width of the first optical waveguide 76 in points except for the groove portion 41. The ridge portion 73 may have a ridge width that is smaller than the width of the second optical waveguide 77 in points except for the groove portion 40.

In the first modification, the width of the interruption portion of the groove portion formed along the outside of the first optical waveguide 76 may be narrowed while the width of the interruption portion of the groove portion formed along the outside of the second optical waveguide 77 may be narrowed. Therefore, the light propagation losses may be reduced in the first optical waveguide 76 and the second optical waveguide 77.

In an exemplary embodiment, the ridge portion 78 may have a shape in which the inside portion of the first optical waveguide 76 is removed. In an exemplary embodiment, the ridge portion 73 may have a shape in which the inside portion of the second optical waveguide 77 is removed. The shape of FIG. 6A may suppress the excessive loss of the outwardly-biased optical mode field to a lower level as illustrated in FIG. 12B.

Figure 13:
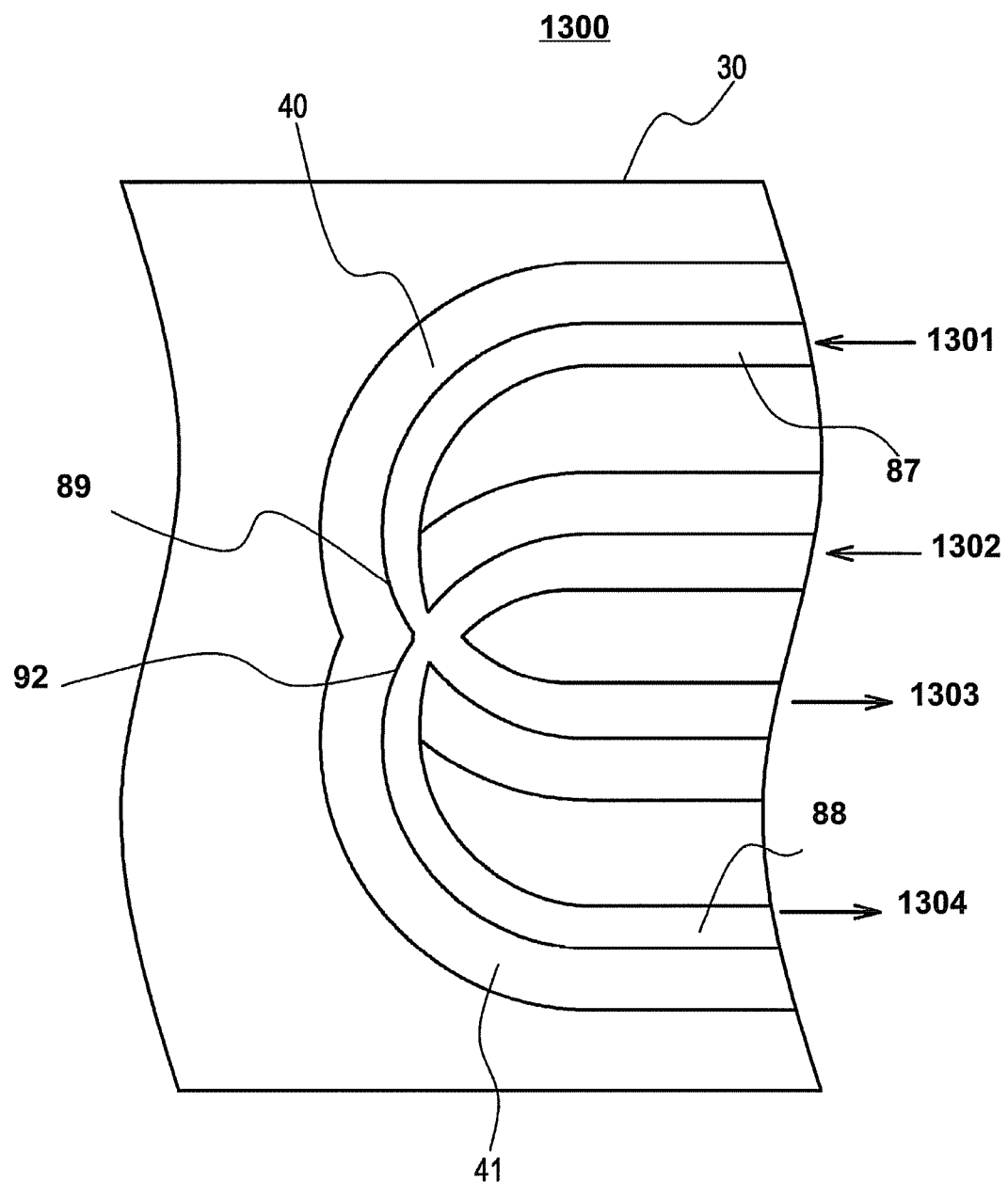
FIG. 13 is a plan view illustrating an optical device according to an exemplary embodiment.

FIG. 13 illustrates an exemplary optical device 1300. The optical device 1300 differs from the optical device 1000 of FIG. 10 in that a first optical waveguide 87 is provided instead of the first optical waveguide 1008 while a second optical waveguide 88 is provided instead of the second optical waveguide 1009. The first optical waveguide 87 includes a ridge portion 89 instead of the ridge portion 11e. The second optical waveguide 88 includes a ridge portion 92 instead of the ridge portion 1011.

The ridge width of the ridge portion 89 is gradually narrowed toward the side of the second optical waveguide 88. The ridge width of the ridge portion 92 is gradually narrowed toward the side of the first optical waveguide 87. At this point, the width of the interruption portion of the groove portion 40 may be narrowed in the bending portion of the first optical waveguide 87 while the width of the interruption portion of the groove portion 41 may be narrowed in the bending portion of the second optical waveguide 88. An influence of the optical mode field mismatch between the ridge portion and the portion except for the ridge portion is reduced by gradually narrowing the ridge width. Therefore, the excessive loss of the first optical waveguide 87, influenced by the ridge portion 89, can be reduced and the excessive loss of the second optical waveguide 88, influenced by the ridge portion 92, can be reduced. Accordingly, the light propagation losses may be suppressed to a lower level in the bending portions of the first optical waveguide 87 and second optical waveguide 88.

The ridge portion 89 has the wide width on the side opposite the first optical waveguide 87 of the groove portion 40, and the ridge portion 92 has the wide width on the side opposite the second optical waveguide 88 of the groove portion 41. Therefore, the excessive losses may be suppressed in the first optical waveguide 87 and the second optical waveguide 88.

Figure 14:
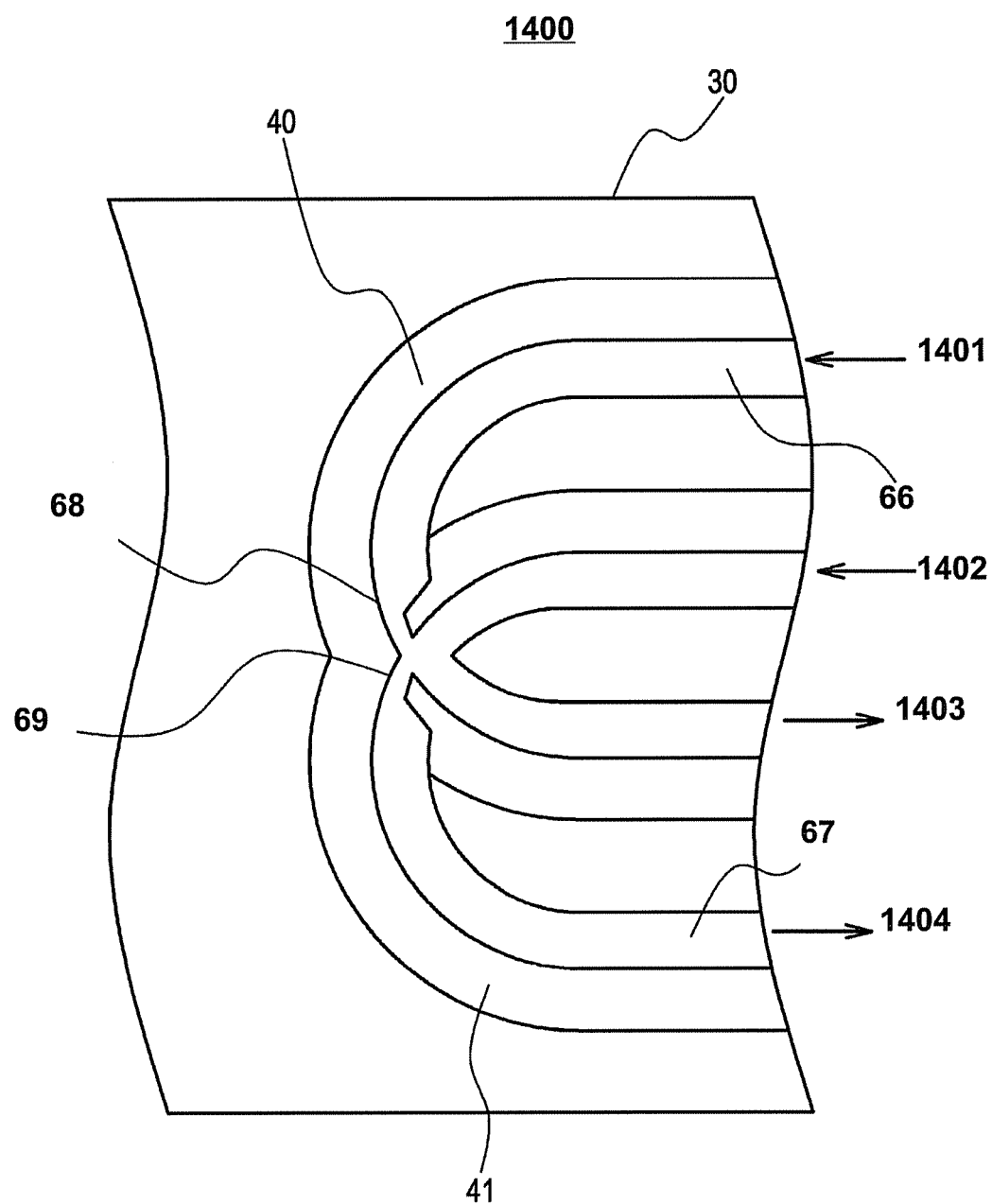
FIG. 14 is a plan view illustrating an optical device according to an exemplary embodiment.

FIG. 14 illustrates an exemplary optical device 1400. The optical device 1400 differs from the optical device 1000 of FIG. 10 in that a first optical waveguide 66 is provided instead of the first optical waveguide 1008 while a second optical waveguide 67 is provided instead of the second optical waveguide 1009. The first optical waveguide 66 includes a ridge portion 68 instead of the ridge portion 11e. The second optical waveguide 67 includes a ridge portion 69 instead of the ridge portion 1011.

The ridge width of the ridge portion 68 is gradually narrowed toward the side of the second optical waveguide 67. The ridge width of the ridge portion 69 is gradually narrowed toward the side of the first optical waveguide 66. At this point, the width of the interruption portion of the groove portion 40 may be narrowed in the bending portion of the first optical waveguide 66 while the width of the interruption portion of the groove portion 41 may be narrowed in the bending portion of the second optical waveguide 67. Therefore, the light propagation losses may be suppressed to a lower level in the bending portions of the first optical waveguide 66 and second optical waveguide 67.

The ridge portion 68 has the wide width on the side opposite the first optical waveguide 66 of the groove portion 40, and the ridge portion 69 has the wide width on the side opposite the second optical waveguide 67 of the groove portion 40. Therefore, the excessive losses may be suppressed in the first optical waveguide 66 and the second optical waveguide 67.

Figure 15:
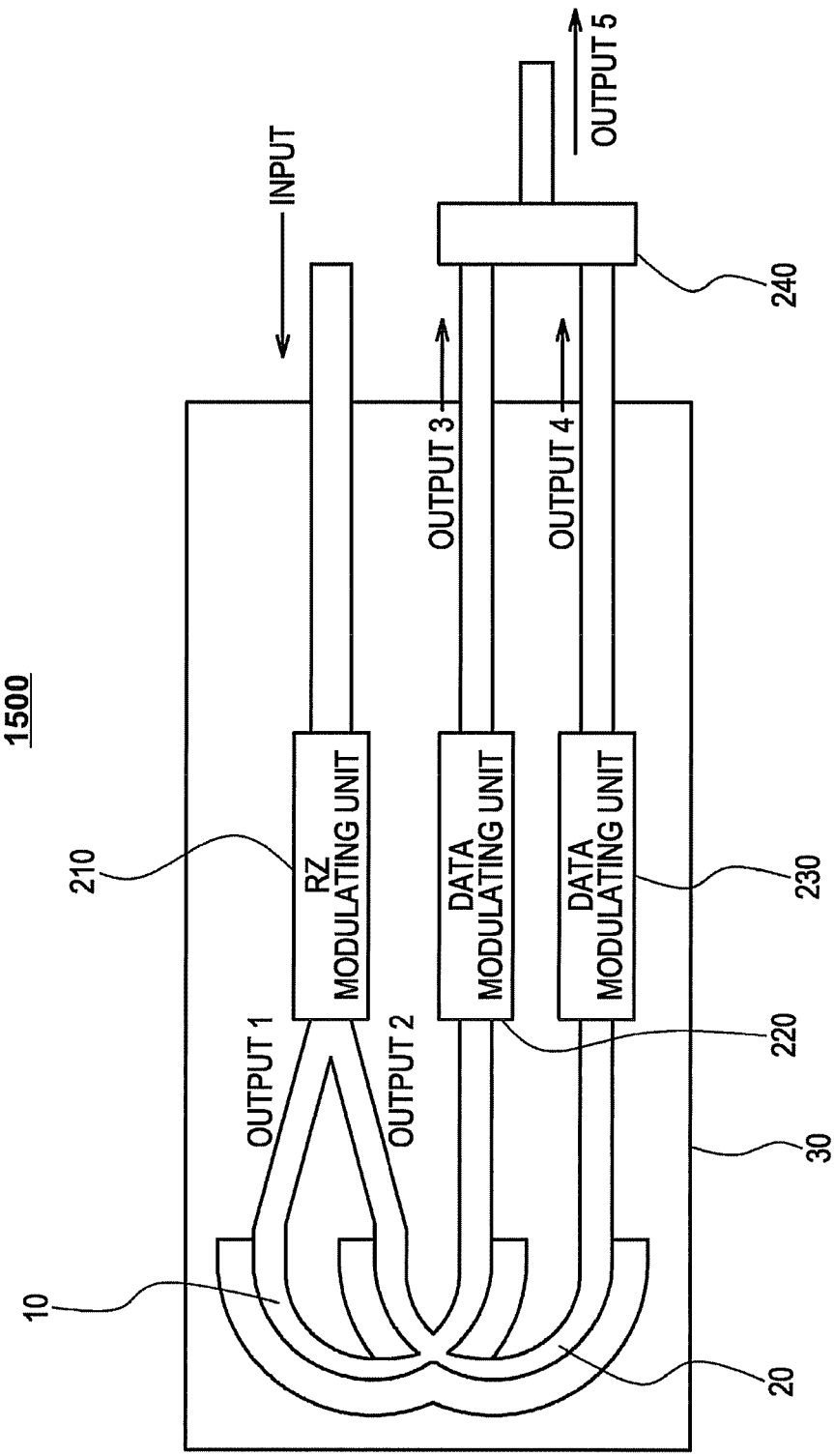
FIG. 15 illustrates an exemplary optical transmitter.

FIG. 15 illustrates an exemplary optical transmitter 1500. The optical transmitter 1500 includes any of the exemplary disclosed optical devices. In the embodiment, the substrate 30 may have an electro-optical effect. The optical transmitter 1500 also includes an RZ modulating unit 210 that acts as an intensity modulating unit, data modulating units 220 and 230, and a polarization multiplexing unit 240. The RZ modulating unit 210 complimentarily supplies first modulated light and second modulated light as an output 1 and an output 2, respectively. The first modulated light and the second modulated light are obtained by performing intensity modulation of input light. The first modulated light may have a normal phase, and the second modulated light may have a reverse phase.

The first modulated light may be fed into the data modulating unit 220 through the first optical waveguide 10. The second modulated light may be fed into the data modulating unit 230 through the second optical waveguide 20. The data modulating unit 220 supplies a signal in which data is added to the first modulated light as an output 3. The data modulating unit 230 supplies a signal in which data is added to the second modulated light as an output 4. The polarization multiplexing unit 240 multiplexes the signals from the data modulating units 220 and 230 to produce a polarization multiplexing signal in which X-polarization and Y-polarization are multiplexed, and the polarization multiplexing unit 240 supplies the polarization multiplexing signal as an output 5.

Figure 16:
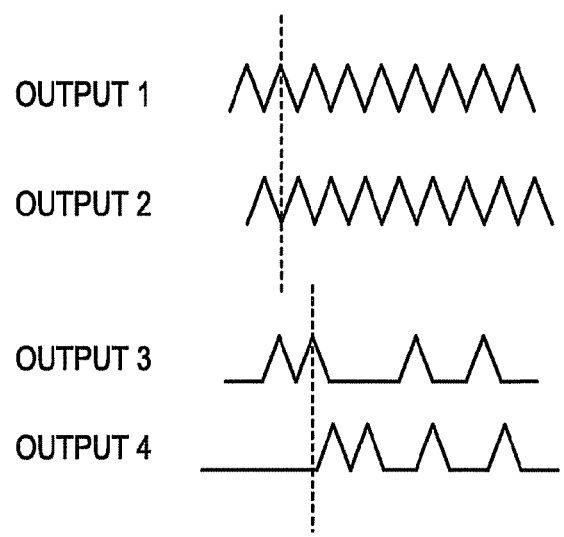
FIG. 16 illustrates an output state when an intensity modulation system is adopted as a data modulation system.
Figure 16:
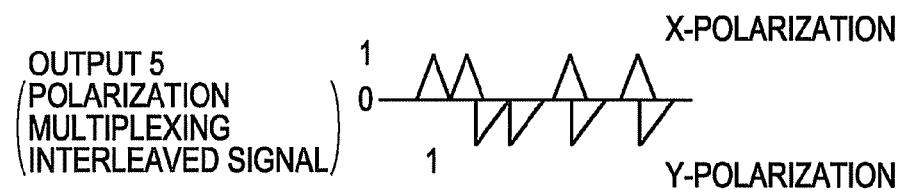

There are various data modulation systems such as intensity modulation system and a phase modulation system. FIG. 16 illustrates an output state in the intensity modulation system. In an exemplary embodiment, two optical path lengths from the RZ modulating unit 210 to the polarization multiplexing unit 240 are equal to each other.

In a third exemplary embodiment, the first modulated signal and the second modulated signal may intersect with each other with a low loss. It is not necessary that the first optical waveguide 10 and second optical waveguide 20 be linearly provided in the intersection portion of the first optical waveguide 10 and the second optical waveguide 20. Therefore, the compact, low-loss optical transmitter may be implemented.

In the embodiments, the bending optical waveguide in which the groove may be formed outside the diffusion optical waveguide has been described by way of example. The invention is not limited to the bending optical waveguide in which the groove may be formed outside the diffusion optical waveguide. For example, when the LiNbO$_3$ substrate is used as the substrate, an ion-exchange optical waveguide that may be formed by ion exchange of Li for H$^+$ in the substrate may be used instead of the diffusion optical waveguide.

In the embodiments, the groove may be filled with air. A large refractive index difference between the substrate and the groove portion may be all that is necessary to be generated. Accordingly, the groove may be filled with low-refractive-index filler such as SiO$_2$ and polyimide. There is no particular limitation to the folding angle of the bending optical waveguide. In the embodiments, the groove portion may be provided outside the bending portion of the bending optical waveguide. Alternatively, the groove portion may be provided inside the bending portion of the bending optical waveguide.

Figure 17:
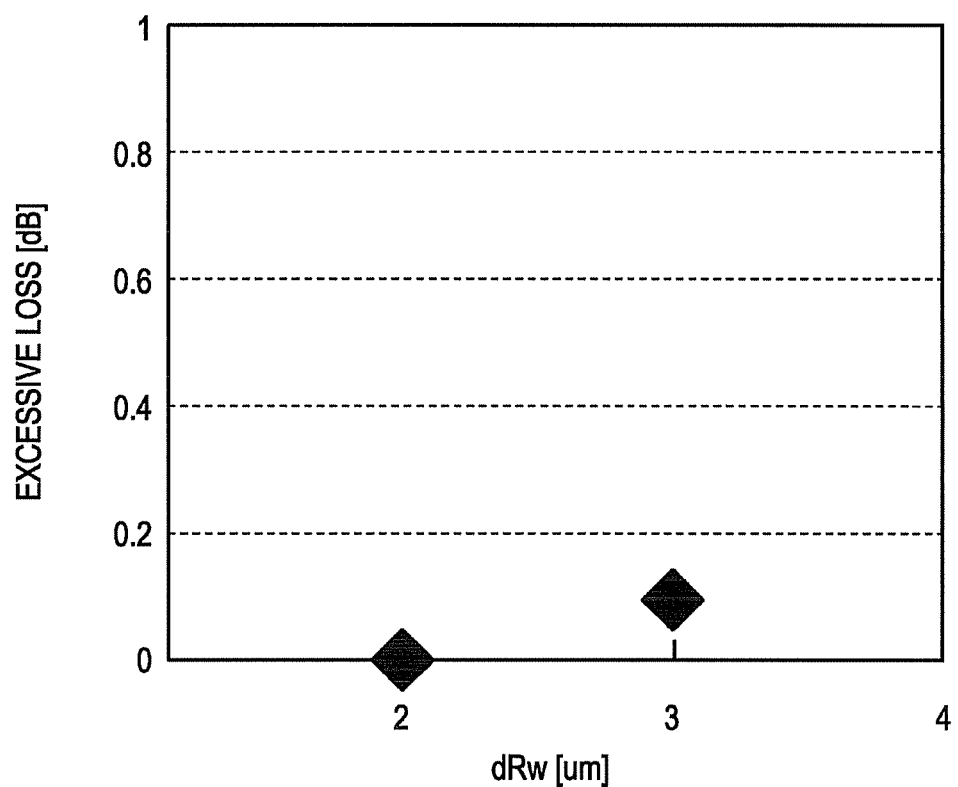
FIG. 17 illustrates measurement result of a light propagation loss.

In an example, the optical device 1300 of FIG. 13 was prepared to measure the loss. The measurement result will be described with reference to FIG. 17. In FIG. 17, a horizontal axis indicates a difference dRw between the optical waveguide width and the ridge width in the intersection portion. A vertical axis indicates an excessive loss caused by the intersection. Although the loss was measured for each optical waveguide, there was no difference among the optical waveguides. It was confirmed that the excessive loss of 0 dB was obtained by setting the difference dRw to 2 μm or more.

Accordingly, in the optical device and optical transmitter of the embodiments, the bending optical waveguide and another optical waveguide may intersect with each other while the enlargement and the connection loss are suppressed.

Further, according to an aspect of the embodiments, any combinations of the described features, functions and/or operations can be provided.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An optical device comprising:
   a substrate;
   a first optical waveguide that is formed in the substrate and has a bending portion; and
   a second optical waveguide that intersects with the bending portion of the first optical waveguide,
   wherein a groove is formed outside the bending portion of the first optical waveguide in the substrate,
   wherein the second optical waveguide has a ridge structure in the groove, the ridge structure having a ridge width that is smaller than a width in a region except for the groove of the second optical waveguide.

2. The optical device according to claim 1, wherein a plurality of the second optical waveguides are provided.

3. The optical device according to claim 1, wherein a region where the second optical waveguide intersects with the first optical waveguide is a bending optical waveguide.

4. The optical device according to claim 1, wherein a region where the second optical waveguide intersects with the first optical waveguide is a bending optical waveguide, and
   the groove is formed inside the first optical waveguide and outside the second optical waveguide in the intersection region of the substrate.

5. An optical transmitter in which the substrate has an electro-optical effect, the optical transmitter comprising:
   the optical device according to claim 1;
   an intensity modulator that performs intensity modulation of input light to respectively feed modulated first modulated light and second modulated light into the first optical waveguide and the second optical waveguide;
   a first modulator that modulates the first modulated light with a first data signal, the first modulated light being obtained through the first optical waveguide;
   a second modulator that modulates the second modulated light with a second data signal, the second modulated light being obtained through the second optical waveguide; and a polarization multiplexor that polarization-multiplexes the pieces of modulated signal light modulated by the first modulator and second modulator.

6. An optical device comprising:
a substrate;
a first optical waveguide that is formed in the substrate and has a bending portion; and
a second optical waveguide that intersects with the bending portion of the first optical waveguide,
wherein a groove is formed outside the bending portion of the first optical waveguide in the substrate,
wherein a region where the second optical waveguide intersects with the first optical waveguide is a bending optical waveguide, and
the groove is formed inside the first optical waveguide and outside the second optical waveguide in the intersection region of the substrate,
wherein the first optical waveguide has a ridge structure having a ridge width that is smaller than a width in a region except for the groove of the first optical waveguide in the groove outside the second optical waveguide, and the second optical waveguide has a ridge structure having a ridge width that is smaller than a width in a region except for the groove of the second optical waveguide in the groove outside the first optical waveguide.

7. The optical device according to claim 6, wherein the ridge structure of the first optical waveguide has a shape in which an inside portion of the first optical waveguide is removed, and
the ridge structure of the second optical waveguide has a shape in which an inside portion of the second optical waveguide is removed.

8. The optical device according to claim 6, wherein the ridge structure of the first optical waveguide is gradually narrowed toward the intersection region with the second optical waveguide, and
the ridge structure of the second optical waveguide is gradually narrowed toward the intersection region with the first optical waveguide.

* * * * *